(12) United States Patent
Shiki et al.

(10) Patent No.: US 8,931,647 B2
(45) Date of Patent: Jan. 13, 2015

(54) HIGHLY DURABLE POROUS PVDF FILM, METHOD OF PRODUCING THE SAME AND WASHING METHOD AND FILTRATION METHOD USING THE SAME

(75) Inventors: Satoshi Shiki, Tokyo (JP); Hiroyoshi Ohya, Tokyo (JP); Noboru Kubota, Tokyo (JP); Makiko Hattori, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 994 days.

(21) Appl. No.: 12/297,580

(22) PCT Filed: Apr. 16, 2007

(86) PCT No.: PCT/JP2007/058272
§ 371 (c)(1),
(2), (4) Date: Oct. 17, 2008

(87) PCT Pub. No.: WO2007/119850
PCT Pub. Date: Oct. 25, 2007

(65) Prior Publication Data
US 2009/0101600 A1   Apr. 23, 2009

(30) Foreign Application Priority Data
Apr. 19, 2006   (JP) .................................. 2006-115973

(51) Int. Cl.
*B01D 71/34*   (2006.01)
*B01D 69/02*   (2006.01)
(Continued)

(52) U.S. Cl.
CPC ............ *B01D 71/34* (2013.01); *B01D 67/0011* (2013.01); *B01D 69/02* (2013.01);
(Continued)

(58) Field of Classification Search
USPC ..................... 210/500.36, 500.23, 649, 636
See application file for complete search history.

(56) References Cited

U.S. PATENT DOCUMENTS 4,399,035 A   8/1983   Nohmi et al.
4,840,733 A   6/1989   Sasaki et al.
(Continued)

FOREIGN PATENT DOCUMENTS

CN   2669966 Y   1/2003
CN   1583232 A   2/2005
(Continued)

OTHER PUBLICATIONS

Ishida et al. Estimation of amorphous specific volume of poly(vinylidene fluoride) as a function of temperature. Kolloid-Z. u. Z. Polymere, vol. 251 (1973) 103-107.*
(Continued)

*Primary Examiner* — Katherine Zalasky
(74) *Attorney, Agent, or Firm* — Finnegan, Henderson, Farabow, Garrett & Dunner, L.L.P.

(57) ABSTRACT

The present invention provides a PVDF porous film and method for producing it, which has high water permeability and high chemical resistance to washing chemicals and the like that has been difficult to realize with conventional polymer porous films, and which can be used over a prolonged period of time, and a method of producing the same and the like. Namely, the present invention provides a porous film in which the degree of crystallization of the PVDF resin is 50% or more but not more than 90%, and the product of the degree of crystallization of the PVDF resin and the specific surface area of the film is 300 (%·m$^2$/g) or more but not more than 2000 (%·m$^2$/g).

14 Claims, 3 Drawing Sheets

(51) Int. Cl.
  *B01D 67/00* (2006.01)
  *C08J 5/18* (2006.01)
  *B01D 69/08* (2006.01)

(52) U.S. Cl.
  CPC *B01D 69/08* (2013.01); *C08J 5/18* (2013.01); *B01D 2323/02* (2013.01); *B01D 2325/30* (2013.01); *B01D 2325/34* (2013.01); *C08J 2327/16* (2013.01)
  USPC .................. 210/500.42; 210/649; 210/500.23; 210/636

(56) References Cited

U.S. PATENT DOCUMENTS

| | | | |
|---|---|---|---|
| 5,145,583 | A | 9/1992 | Angleraud et al. |
| 5,196,508 | A * | 3/1993 | Sipsas et al. .................. 528/503 |
| 5,198,505 | A * | 3/1993 | Sipsas et al. ............... 525/326.2 |
| 6,270,674 | B1 | 8/2001 | Baurmeister et al. |
| 7,344,781 | B2 * | 3/2008 | Drujon et al. ................. 428/421 |
| 7,455,772 | B2 | 11/2008 | Tada et al. |
| 7,635,513 | B1 | 12/2009 | Hoshuyama et al. |
| 2003/0150808 | A1 | 8/2003 | Morikawa et al. |
| 2003/0232184 | A1 | 12/2003 | Morikawa et al. |
| 2008/0210624 | A1 | 9/2008 | Li et al. |

FOREIGN PATENT DOCUMENTS

| | | |
|---|---|---|
| EP | 1010457 * | 6/2000 |
| EP | 1 230 970 A1 | 8/2002 |
| JP | 58-93734 | 6/1983 |
| JP | 63-139930 | 6/1988 |
| JP | 05-23557 | 2/1993 |
| JP | 07-12419 | 1/1995 |
| JP | 10-316793 | 12/1998 |
| JP | 2002-504020 | 2/2002 |
| JP | 2004-25067 | 1/2004 |
| JP | 2004-202438 | 7/2004 |
| JP | 2005-194461 | 7/2005 |
| JP | 2005-270845 | 10/2005 |
| JP | 2005-296849 | 10/2005 |
| KR | 0177273 | 3/1999 |
| RU | 2040961 | 8/1995 |
| WO | WO 02/064240 A1 | 8/2002 |
| WO | WO 03/031038 A1 | 4/2003 |
| WO | WO 2004/043579 A1 | 5/2004 |
| WO | WO 2004/081109 A1 | 9/2004 |
| WO | WO 2005/123234 | 12/2005 |

OTHER PUBLICATIONS

Ishida et al. Annealing effects in poly(vinylidene fluoride) as revealed by specific volume measurements, differential scanning calorimetry, and electron microscopy. J. Polymer Sci: Polymer Physics Edition, vol. 11 (1978) 2153-2171.*

Cheng et al. Formation of particulate microporous poly(vinylidene fluoride) membranes by isothermal immersion precipitation from the 1-octanol/dimethylformamide/poly(vinylidene fluoride) system. Polymer 40 (1999) 2395-2403.*

Office Action dated Feb. 26, 2010 issued in corresponding Russian application.

Russian Document 2, p. 73 (1991).

Russian Document 3, p. 10 (1975).

Muhamad Nasir et al., "Control of Diameter, Morphology, and Structure of PVDF Nanofiber Fabricated by Electrospray Deposition," Journal of Polymer Science, Part B., Polymer Physics, vol. 44, pp. 779-786 (2006).

Shinji Ando et al., "Solid-state $^1H \rightarrow {}^{19}F/{}^{19}F \rightarrow {}^1H$ CP/MAS NMR study of poly(vinylidene fluoride)," Magnetic Resonance in Chemistry, vol. 40, pp. 97-106 (2002).

Database WPI, Week 198803, Thomson Scientific, London, GB, AN 1988-019079, XP002619669, & JP 62 282606 A (Nippon Oil Seal Ind Co Ltd) Dec. 8, 1987.

Supplementary European Search Report dated Feb. 14, 2011 issued in European Patent Application No. 07741708.7.

Office Action for JP Application No. 2008-511021 dated Sep. 4, 2013.

IUPAC. Compendium of Chemical Terminology, $2^{nd}$ ed. (the "Gold Book"), compiled by A.D. McNaught and A. Wilkinson. Blackwell Scientific Publications, Oxford (12997).

Office Action for EP Application No. 07 741 708.7 dated Dec. 11, 2012.

\* cited by examiner

HIGHLY DURABLE POROUS PVDF FILM, METHOD OF PRODUCING THE SAME AND WASHING METHOD AND FILTRATION METHOD USING THE SAME

CROSS REFERENCE TO RELATED APPLICATIONS

This application is a national phase application based on international application number PCT/JP2007/058272, filed Apr. 16, 2007, and claims priority of Japanese Patent Application No. 2006-115973, filed Apr. 19, 2006, the content of both of which is incorporated herein by reference.

Background

The present invention relates to a porous PVDF film, which has superior water permeability and chemical resistance, a method of producing the same, and a washing method and filtering method using the same.

Filtration processes are widely used in industrial fields such as the production of sterile water, highly pure water or drinking water as well as the purification of air. In addition, the application range of such filtration processes have expanded in recent years to include such fields as secondary or tertiary treatment of domestic wastewater or industrial wastewater at sewage treatment plants, as well as the treatment of high-turbidity water such as solid-liquid separation in septic tanks.

The filtering materials used in such filtration processes consist of membrane modules comprised of a collection of hollow fiber membranes, in which polymers having superior processability are formed into hollow tubes, or flat membranes in which polymers are formed into the shape of sheets. However, in the case of using such membrane modules for the treatment of water and the like, the membrane surface is obstructed by suspended solids separated by filtration, thereby resulting in the problem of a decrease in the water permeation capacity of the membrane module.

For example, in the case of using this type of membrane module for solid-liquid separation in a septic tank, obstruction of the membrane surface occurs due to filtration as described above, and since this causes a considerable decrease in water permeation capacity of the membrane module, it is typically necessary to periodically wash the membrane after a predetermined amount of time or after filtering a predetermined amount. In general, the causes of this type of membrane obstruction are classified into physical obstruction (plug) in which fine particles and the like accumulate on the surface of or inside the membrane, and chemical obstruction (foul) in which organic matter and the like accumulates by being adsorbed on the surface of or inside the membrane.

Air scrubbing treatment, in which the membrane is shaken by continuously or intermittently supplying air to raw water during filtration or backwashing operation, is used as an effective means of inhibiting physical obstruction. On the other hand, removal of accumulated organic matter and the like by decomposing using chemical agents in the manner of oxidizing agents such as sodium hypochlorite or bases such as sodium hydroxide is used as an effective means of eliminating chemical obstruction. However, such chemical agents not only decompose accumulated organic matter, but also simultaneously and gradually decompose and cause deterioration of the polymer composing the membrane. Consequently, as chemical washing is repeated, sheet-like membranes end up rupturing, while hollow fiber membranes end up rupturing, thereby making long-term use of the membrane module difficult.

Recently, membranes composed of materials such as inorganic materials or fluorine-based polymers such as polytetrafluoroethylene (PTFE) having superior chemical resistance have been commercially released for the purpose of preventing membrane deterioration caused by such chemical agents. However, since these materials have inferior processability as compared with conventional polymers, it was difficult to produce various membrane shapes and pore diameters effective for filtration using these materials.

On the other hand, although polyvinylidene fluoride (PVDF) resins are used as polymer components of porous films since they have comparatively superior processability among fluorine-based polymers, they have the disadvantage of having low resistance to base as compared with other fluorine-based resins. Consequently, it was difficult to produce a porous film using PVDF resin that is able to withstand long-term use accompanying washing with base.

In addition, PVDF resins have inferior solubility in organic solvents as compared with polymers such as polysulfones, polyether sulfones, polyacrylonitriles or cellulose acetates typically used in the production of porous films by wet or dry-wet methods. Consequently, in the case of producing a porous film by a dry-wet method using PVDF resin, it was difficult to achieve practical levels of film pore diameter, water permeability and durability.

Methods for producing PVDF hollow fiber membranes suitable for use in dialysis membranes have been disclosed as examples of porous films using these PVDF resins (see, for example, Japanese Patent Publication No. 1988180). However, since PVDF hollow fiber membranes produced according to such a production method not only have weak physical strength as well as poor water permeability as stated in the description thereof, they are not suitable for use in applications requiring high water permeability and pressure resistance (durability).

In order to compensate for this low physical strength, methods have been disclosed for forming a film on a hollow support (see, for example, International Publication No. WO 2004/043579). However, in such composite films, separation is predicted to occur at the interface between the support and film due to long-term, repeated use.

In addition, the embedding of fibers in the thick portion of a hollow fiber membrane has been disclosed in order to maintain the physical strength of PVDF hollow fiber membranes (see, for example, Japanese Patent Application Laid-open No. 2005-270845). In this method, however, since it is predicted to be difficult to accurately embed fibers in the thick portion of a hollow fiber membrane and exposure of fibers on the membrane surface leads to membrane defects, this method is not suitable for applications such as filtration of drinking water requiring a high level of filtration.

Moreover, the production of a porous membrane has been disclosed that uses a thermally-induced phase separation method to improve physical strength (see, for example, International Publication No. WO 2003/031088). A porous film obtained according to this production method has a high degree of crystallization and high strength while also able to achieve a high level of water permeability by undergoing drawing treatment and the like. However, in the resulting porous film, since the porous body that composes the film is composed of spherical crystals, has a large specific surface area and has an excessively large liquid contact surface area as a result thereof, the resistance to alkaline chemical washing, which is an extremely effective method for applications requiring high water permeability, is remarkably low. Consequently, the resulting porous film is unable to undergo chemical washing for easily and effectively removing film obstructions, and as a result thereof, long-term use while maintaining high water permeability of a membrane module is difficult.

SUMMARY

In order to solve the above-mentioned problems, an object of the present invention is to provide a porous PVDF film, which has high water permeability as well as high chemical resistance to washing chemicals and the like, which has been difficult to realize with conventional polymer porous films, and which can be used for a long period of time, a method of producing the same, and a washing method and filtering method using the same.

As a result of conducting extensive studies to solve the above-mentioned problems, the inventors of the present invention focused on the degree of crystallization of PVDF resin, which serves as the main component of the polymer component composing a porous film, and on the specific surface area of the porous film, and found that a porous film having a specific structure in which these parameters are in a prescribed relationship has superior water permeability and chemical resistance as compared with conventional polymer films, and that such a polymer film can be produced both easily and stably, thereby leading to completion of the present invention.

Namely, the present invention provides the following (1) to (14):

(1) a porous film comprising a polymer component having a PVDF resin as a main component thereof, wherein the degree of crystallization of the PVDF resin is 50% or more but not more than 90%, and the product of the degree of crystallization of the PVDF resin and a specific surface area of the film is 300 (%·m$^2$/g) or more but not more than 2000 (%·m$^2$/g);

(2) the porous film described in (1), wherein the total amount of β-type crystal and γ-type crystal in a crystalline portion of the PVDF resin is 30% or less based on the total amount of the crystalline portion of the PVDF resin;

(3) the porous film described in (1) or (2), wherein polyethylene glycol having a weight average molecular weight of 20,000 or more but not more than 300,000 is contained as the polymer component at 0.01 parts by weight or more but not more than 3 parts by weight based on 100 parts by weight of the PVDF resin;

(4) the porous film described in any of (1) to (3), wherein the PVDF resin has an intramolecular irregular sequence ratio as determined by $^{19}$F-NMR measurement of 8.8% or more but less than 30.0%;

(5) the porous film described in any of (1) to (4), wherein the porous film has a film structure of a hollow fiber membrane;

(6) the porous film described in any of (1) to (5), wherein the porous film has a film structure in which the backbone of the polymer component forms a mesh-like network and pores are provided therein, and the thickness of the backbone of the polymer component increases continuously or in a stepwise manner to at least ⅕ the film thickness from the side of the top and bottom film surfaces having the greatest density;

(7) a method for washing a porous film, comprising contacting the porous film described in any of (1) to (6) with an alkaline solution;

(8) a filtering method, comprising contacting the porous film described in any of (1) to (6) with an aqueous solution and an alkaline solution alternately at least one time;

(9) a method for producing a porous film comprising: producing a porous film having a PVDF resin as a main component thereof by extruding, from a molding nozzle, a film-forming solution which at least comprises a hydrophobic polymer component having a PVDF resin as a main component thereof, a hydrophilic polymer component and a common solvent for both the hydrophobic and hydrophilic polymer components, and solidifying the film-forming solution in a solution having water as a main component thereof, wherein polyethylene glycol having a weight average molecular weight of 20,000 or more but not more than 150,000 is used as the hydrophilic polymer component;

(10) the method for producing a porous film described in (9), wherein a PVDF resin having an intramolecular irregular sequence ratio as determined by $^{19}$F-NMR measurement of 8.8% or more but less than 30.0% is used as the PVDF resin;

(11) the method for producing a porous film described in (9) or (10), wherein the film-forming solution contains 20% by weight or more but not more than 35% by weight of the hydrophobic polymer component, and 8% by weight or more but not more than 30% by weight of the hydrophilic polymer component;

(12) the method for producing a porous film described in any of (9) to (11), wherein the temperature of the solution for solidifying the film-forming solution (Tb° C.) satisfies the relationship of Td+5≤Tb≤Td+30 and the relationship of Td≤Tc≤Tb with respect to the temperature of the film-forming solution (Td° C.) and the cloud point temperature of the film-forming solution (Tc° C.);

(13) the method for producing a porous film described in any of (9) to (12), wherein the molding nozzle is a double-tube nozzle, and a porous film having a hollow fiber membrane structure is produced by extruding the film-forming solution from the molding nozzle together with a hollowing agent, and solidifying the same in a solution having water as a main component thereof; and

(14) a method for producing a porous film described in any of (9) to (13), wherein the film-forming solution contains at least dimethylacetoamide as the common solvent.

According to the porous film of the present invention, since the porous film has high water permeability and high chemical resistance, it can be used while in contact with washing chemicals and other chemical agents and is able to easily recover from decreases in water permeability caused by obstruction of the film surface. In addition, since the porous film of the present invention is able to inhibit decreases in film strength with respect decomposition and deterioration by washing chemicals and other chemical agents, it can be used over a long period of time. Moreover, since the porous film of the present invention can be produced both easily and stably, it has superior productivity and economy.

DETAILED DESCRIPTION

Figure 1:
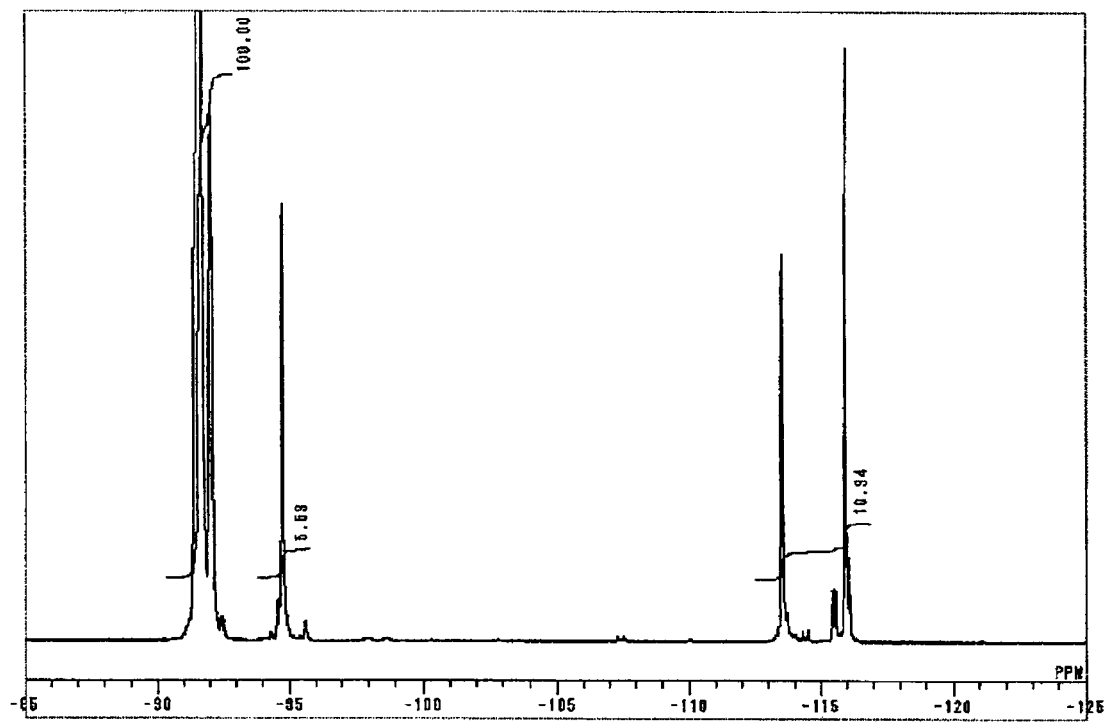
FIG. 1 shows the $^{19}$F-NMR spectrum of a porous film of EXAMPLE 7 in the present invention.

The following provides an explanation of embodiments of the present invention. Furthermore, the following embodiments are indicated for explaining the present invention, and the present invention is not limited to only these embodiments, but rather the present invention can be carried out in various forms without deviating from the gist thereof.

The porous film of the present invention contains a PVDF resin as a polymer component that composes the film. Here, a PVDF resin refers to a homopolymer of vinylidene fluoride or a copolymer containing vinylidene fluoride at a molar ratio of 50% or more. The PVDF resin is preferably a homopolymer from the viewpoint of superior strength. In the case the PVDF resin is a copolymer, a known monomer can be suitably selected for the other copolymerizable monomer copolymerized with vinylidene fluoride monomer, and although there are no particular limitations thereon, a fluorine-based monomer or chlorine-based monomer, for example, can be used preferably. Furthermore, although there are no particular limitations on the weight average molecular weight (Mw) of the PVDF resin, it is preferably 100,000 or more but not more than 1,000,000, and more preferably 150,000 or more but not more than 500,000.

The porous film contains PVDF resin as the main component of the polymer component. Here, "containing as the main component" refers to containing at 50% by weight or more as the solid content of the polymer component. In addition, although there are no particular limitations thereon, the porous film preferably contains PVDF resin as the main component of the polymer component at 80% by weight or more but not more than 99.99% by weight, and more preferably at 90% by weight or more but not more than 99% by weight. On the other hand, the porous film may also contain another polymer component. Although there are no particular limitations thereon, the other polymer component is preferably that which is compatible with the PVDF resin, and a fluorine-based resin having high chemical resistance similar to that of PVDF resin, for example, can be used preferably. In addition, a hydrophilic resin in the manner of polyethylene glycol to be described later may also be used as another polymer component.

Since the porous film embodies high chemical resistance and water permeability, the degree of crystallization of the PVDF resin that composes the film is 50% or more but not more than 90%, and the product of the degree of crystallization and the specific surface area of the porous film is 300 (%·$m^2$/g) or more but not more than 2000 (%·$m^2$/g).

Here, if the degree of crystallization of the PVDF resin is less than 50%, film rigidity becomes low and the resin is deformed by filtration pressure, thereby making this unsuitable for filtration. Deterioration of PVDF resin by chemicals is presumed to occur starting in the amorphous portion that demonstrates flexibility. Consequently, if the degree of crystallization of the PVDF resin exceeds 90% and the amorphous portion becomes relatively sparse, the entire porous film is embrittled and easily broken when the amorphous portion is decomposed and deteriorated by washing chemicals and the like. On the other hand, if the specific surface area of the porous film is excessively small, water permeability decreases thereby making the porous film unsuitable for filtering applications. Conversely, if the specific surface area of the porous film is excessively large, although water permeability is improved, since the surface area in contact with chemicals increases, chemical resistance ends up decreasing. On the basis of these findings, in a porous film having superior water permeability and chemical resistance, the product of the specific surface area of the film and the degree of crystallization is required to be within the range indicated above, and is preferably 300 (%·$m^2$/g) or more but not more than 1500 (%·$m^2$/g), and more preferably 300 (%·$m^2$/g) or more but not more than 1000 (%·$m^2$/g). Furthermore, although there are no particular limitations thereon, the specific surface area of the porous film is preferably 3.5 ($m^2$/g) or more but not more than 30 ($m^2$/g), and more preferably 5.0 ($m^2$/g) or more but not more than 20 ($m^2$/g).

Moreover, in order to improve chemical resistance, and particularly improve resistance to base, which promotes deterioration of the PVDF resin, the total amount of β-type crystal and γ-type crystal in the crystalline portion of the PVDF resin that composes the polymer film is preferably 30% or less, more preferably 25% or less and even more preferably 20% or less based on the total amount of the crystalline portion. Here, there are three known types of crystal structures of PVDF resin, consisting of an α-type, β-type and γ-type, and PVDF resin having a degree of crystallization of 50% or more but not more than 90% can contain these in the crystalline portion thereof. However, since β-type and γ-type crystal structures are thermodynamically unstable, if these structures are contained in large amounts in crystals, the porous film is presumed to have a portion susceptible to chemical deterioration in the vicinity of the interface between the crystalline portion and amorphous portion, thereby resulting in a tendency for chemical resistance of the entire porous film to decrease. Furthermore, although there are no particular limitations thereon, the lower limit of the total amount of β-type crystals and γ-type crystals is preferably as close to 0% as possible. In addition, the PVDF resin may contain either β-type crystals or γ-type crystals in the crystalline portion thereof.

In addition, the PVDF resin preferably contains an irregular sequence at a certain ratio. Here, an irregular sequence refers to a portion in which, differing from the regular sequence, $CF_2$ moieties are bound adjacently in the molecular chain instead of the normal (standard) PVDF sequence consisting of regularly alternating $CF_2$ and $CH_2$ moieties, and the ratio of these moieties can be determined by $^{19}$F-NMR measurement.

The ratio of irregular sequence in molecules of the PVDF resin as determined by $^{19}$F-NMR measurement from the viewpoint of durability and film strength is preferably 8.8% or more but less than 30.0%. In the case of a low irregular sequence ratio, namely in the case of PVDF resin having a highly regular PVDF molecular chain sequence, deterioration by washing chemicals tends to progress rapidly. In the case of a high irregular sequence ratio, namely in the case of PVDF resin having a highly irregular PVDF molecular chain sequence, the characteristic crystallinity of PVDF resin decreases, tending to result in a porous film having low strength. The intramolecular irregular sequence ratio as determined by $^{19}$F-NMR measurement of the PVDF resin is more preferably 9.0% or more but less than 25% and particularly preferably 10% or more but less than 20%.

In addition, the porous film preferably contains polyethylene glycol (also referred to as polyethylene oxide) having a weight average molecular weight (Mw) of 20,000 or more but not more than 300,000 for the polymer component at 0.01 parts by weight or more but not more than 3 parts by weight based on 100 parts by weight of PVDF resin. As a result of the polymer film containing this polyethylene glycol, since hydrophilicity of the film surface increases and a layer of water molecules is easily formed on the film surface during contact with an aqueous solution, the frequency of contact between the polymer component that composes the porous film and washing chemicals is presumed to be reduced by the layer of water molecules formed on the film surface, and as a result thereof, chemical resistance of the porous film can be improved. Here, if the weight average molecular weight (Mw) of the polyethylene glycol is less than 20,000, elution of polyethylene glycol from the film tends to increase. Conversely, if the weight average molecular weight (Mw) of the polyethylene glycol exceeds 300,000, a portion occurs in the porous body that forms the porous film in which the polyethylene glycol is contained in a spherical form, thereby tending to decrease the strength of the porous body. On the other hand, if the content of the polyethylene glycol is less than 0.01 parts by weight, it tends to be difficult for a layer of water molecules to form, while if the content of the polyethylene glycol exceeds 3 parts by weight, the polyethylene glycol excessively attracts water molecules, which tends to cause the film to swell and water permeability to decrease.

Although there are no particular limitations on the form in which the polyethylene glycol is contained, and polyethylene glycol molecules may be made to be present only on the surface layer of the porous body by coating or graft polymerization, for example, at least a portion of the polyethylene glycol molecules are preferably embedded in the backbone of the porous body from the viewpoint of sustaining the effect of improving chemical resistance for a long period of time. Although chemical resistance improvement effects are demonstrated regardless of the form, in the case of applying polyethylene glycol to the surface layer of the porous body by coating and the like, the polyethylene glycol elutes over time during use in water, while in the case of physically bonding the polyethylene glycol to the surface layer of the porous body by graft polymerization and the like, the bonding sites are severed by washing chemicals when washing the film. Thus, it tends to be difficult to sustain the effect of improving chemical resistance over a long period of time in either of these cases.

The porous film preferably has a film structure of a hollow fiber membrane. Here, a hollow fiber membrane refers to a film having the form of a hollow ring. As a result of the porous film having a film structure of a hollow fiber membrane, the film surface area per module unit volume can be increased as compared with flat films. In addition, if the porous film has a film structure of a hollow fiber membrane, there is the advantage of being able to effectively use methods such as backwashing, by which deposits are removed by causing cleaning liquid to permeate in a direction opposite from the direction of filtration, or air scrubbing, by which deposits are removed by shaking the film by introducing air bubbles into the module, to wash the film. The inner diameter of a hollow fiber membrane is typically 0.10 mm or more but not more than 5 mm, and the outer diameter thereof is typically 0.15 mm or more but not more than 6 mm. In addition, the ratio of the outer diameter to the inner diameter of the hollow fiber membrane is preferably 1.3 or more but not more than 2.5 from the viewpoint of a proper balance between strength and water permeability as a hollow fiber membrane.

In addition, the amount of time required for the hollow fiber membrane to be crushed at a pressure difference of 0.4 MPa in a filtration pressure creep test, in which the time for crushing a hollow fiber membrane is measured by continuously applying a prescribed pressure difference between the inside and outside of the membrane from the outer surface side of the membrane, is preferably 150 hours or more. Here, crushing of the membrane refers to the hollow fiber membrane being unable to maintain a circular or oval shape, and in the case of an oval ring, refers to the state in which the ratio between the long axis and short axis of the outer diameter of the hollow fiber membrane increases beyond 1.5. In the case the time required for crushing is short, there is tendency for the membrane to be easily crushed as a result of repeatedly applying pressure during filtration or backwashing. As a result of making the time required for crushing at a pressure difference of 0.4 MPa 150 hours or more, the film of the present invention is able to adequately satisfy the (product) service life considered to be required in the intended applications thereof.

Moreover, the pure water permeation volume per membrane unit surface area of the hollow fiber membrane based on the inner surface area of the hollow fiber membrane when passing pure water at 25° C. through the hollow fiber membrane at a filtration pressure of 0.1 MPa is preferably 500 $(L/m^2 \cdot hr)$ or more. The pure water used at this time is distilled water or water filtered through an ultrafiltration membrane or reverse osmosis membrane having a fraction molecular weight of 10,000 or less. In the case this pure water permeation volume is low, the number of membrane modules required when treating a prescribed amount within a fixed period of time increases, thereby increasing the space occupied by filtration equipment. Although a prescribed amount can be treated within a fixed period of time by setting a higher filtration pressure in order to avoid this, in this case, together with the membrane module requiring a higher withstand pressure, energy costs required for filtration increase, thereby hindering productivity. From this viewpoint, the pure water permeation volume is preferably as high as possible, and more specifically, is preferably 700 $(L/m^2 \cdot hr)$ or more and more preferably 1000 $(L/m^2 \cdot hr)$ or more.

Moreover, the polymer film described above preferably has a film structure in which the backbone of the polymer component forms a mesh-like network and pores are provided therein, or in other words, preferably has a porous film structure in which the backbone of the polymer component of the hollow fibers is three-dimensionally crosslinked in the form of a mesh, and pores are provided between the backbone of the polymer component.

In addition, the porous film preferably has a structure in which the thickness of the backbone of the polymer component that forms the pores increases continuously or in a stepwise manner to at least ⅕ the film thickness from at least the surface having the greatest density among the top and bottom film surfaces. As a result of having such a structure, even if a portion of the surface is deteriorated by chemicals, since the thick portion of the film has a thick backbone, damage to the entire film can be inhibited. Here, a surface having the greatest density refers to the surface having the smaller average pore diameter of pores present per unit surface area among the top and bottom film surfaces of the porous film, and in the present description, is determined by a measurement method used in the examples to be described later. The pore diameter of the surface having the greatest density at this time is typically 0.001 µm or more but not more than 0.5 µm, and as a result of filtering from the side of the surface having the greatest density, physical obstruction of the inside of the porous film can be more effectively inhibited while maintaining high water permeability. In addition, a porous film having such a structure is particularly suitable for applications in which the porous film is used repeatedly while physically or chemically washing. From the viewpoint of obtaining safer filtered water having higher water quality, the pore diameter of the surface having the greatest density is preferably 0.001 µm or more but not more than 0.05 µm.

Although a porous film as described above can be preferably used in aqueous solution filtration applications, due to its superior water permeability and chemical resistance, it can also be used preferably in applications accompanying contact with chemicals. In particular, this porous film can be used particularly preferably in applications accompanying contact with base, for which the application of conventional PVDF porous films was limited. Here, applications accompanying contact with base include, but are not particularly limited to, filtration of alkaline solutions, repeatedly filtering non-alkaline solutions while washing using an alkaline solution, and simply washing using an alkaline solution. Furthermore, an alkaline solution refers to a solution at least containing an alkaline substance and in a more preferable aspect thereof, refers to a solution in which the concentration of alkaline substance is 0.001% by weight or more but not more than 20% by weight.

The following provides an explanation of a method of producing the polymer film of the present invention.

The polymer film of the present invention is preferably produced by a so-called wet film formation method, in which a film-forming solution (spinning solution), at least comprising a hydrophobic polymer component having a PVDF resin as a main component thereof, a hydrophilic polymer component and a common solvent for both the hydrophobic polymer component and the hydrophilic polymer component, is extruded from a molding nozzle followed by solidifying in a solution having water as a main component thereof; or, a so-called dry-wet film formation method, in which the film-forming solution is extruded from a molding nozzle followed by securing a prescribed free running interval. A hydrophilic polymer component as referred to here in the present invention is defined as a polymer component in which the critical surface tension ($\gamma c$) of the polymer at 20° C. is 50 (mN/m) or more, while a hydrophobic polymer component is defined as a polymer component in which the surface tension ($\gamma c$) of the polymer at 20° C. is less than 50 (mN/m).

In this production method, a hydrophobic polymer component for forming a porous film having a PVDF resin as a main component thereof and a hydrophilic component in the form of a hydrophilic polymer component are first dissolved in a common solvent for both the hydrophobic polymer component and the hydrophilic polymer component to produce a porous film-forming solution. The polymer components for forming the porous film used at this time may be PVDF resin alone or one of more types of other polymers may be mixed in for improving the properties of the film.

In the case of mixing in other polymers, there are no particular limitations on the other polymers provided they are compatible with PVDF resin. For example, a hydrophilic polymer may be used in the case of desiring to impart hydrophilicity to the film, or a hydrophobic polymer may be used in the case of desiring to further enhance hydrophobicity, and a polymer of a fluorine resin is used preferably. In the case of mixing in other polymers, the film-forming solution preferably contains 80% or more, and preferably 90% or more, of the PVDF resin based on the total solid content of the polymer components.

In the production method of the present invention, polyethylene glycol (also referred to as polyethylene oxide) having a weight average molecular weight (Mw) or 20,000 or more but not more than 150,000 is used as the hydrophilic polymer component incorporated in the film-forming solution. Although a porous film can be produced even if polyethylene glycol having a weight average molecular weight of less than 25,000 is used, it tends to be difficult to satisfy a proper balance between degree of crystallization and specific surface area as intended by the present invention. In addition, in the case the weight average molecular weight exceeds 150,000, it tends to be difficult to uniformly dissolve the main component of the hydrophobic polymer component that forms the porous film in the form of the PVDF resin in the spinning solution. The weight average molecular weight of the polyethylene glycol is preferably 30,000 or more but not more than 120,000 from the viewpoint of obtaining a spinning solution having superior film forming properties. Furthermore, the ratio of the polyethylene glycol in the hydrophilic polymer component based on the solid content of the hydrophilic polymer component is preferably 80% or more, more preferably 90% or more and even more preferably 95% or more from the viewpoint of obtaining a spinning solution having superior film forming properties while also maintaining a proper balance between the degree of crystallization and specific surface area.

As has been described above, in the production method of the present invention, although it is necessary to use at least one type of polyethylene glycol for the hydrophilic polymer component, two or more types of polyethylene glycol may be used or other hydrophilic polymer components may be used in combination therewith. There are no particular limitations on the other hydrophilic polymer components able to be used in combination with the polyethylene glycol, and examples thereof include polyvinylpyrrolidone and partially saponified polyvinyl alcohol.

A polyethylene glycol that exists in the form of an industrial product may be used alone, or that having been prepared by mixing a plurality of types thereof may be used for the polyethylene glycol that satisfies the requirements indicated above. Moreover, polyethylene glycol formed by using a polyethylene glycol having a large weight average molecular weight as a raw material followed by adjusting to a suitable weight average molecular weight by chemical or physical treatment thereof may also be used.

Moreover, the PVDF resin used in the film-forming solution preferably contains an irregular sequence at a certain ratio in terms of obtaining a film having superior chemical resistance, and as previously described, a PVDF resin having an intramolecular irregular sequence ratio as determined by $^{19}$F-NMR measurement of 8.8% or more but less than 30.0% is used preferably.

Moreover, although there are no particular limitations on the mixing ratio of the hydrophobic polymer component and hydrophilic polymer component in the film-forming solution, preferably the ratio of the hydrophobic polymer component is 20% by weight or more but not more than 35% by weight, the ratio of the hydrophilic polymer component is 8% by weight or more but not more than 30% and the remainder is solvent, and more preferably, the ratio of the hydrophobic polymer component is 25% by weight or more but not more than 35% by weight, the ratio of the hydrophilic polymer component is 10% by weight or more but not more than 25% by weight, and the remainder is solvent. Forming a porous film using a film-forming solution within this range facilitates adjustment of the remainder of the polyethylene glycol to a prescribed amount while also facilitating the obtaining of a porous film having high strength, superior chemical resistance and superior water permeability.

In addition, in the production method described above, the solution temperature (Tb° C.) of the solution tank of the solution having water as a main component thereof in which the film-forming solution is solidified during film formation satisfies the relationship of Td+5≤Tb≤Td+30 with respect to the temperature of the film-forming solution (Td° C.), and preferably satisfies the relationship of Td≤Tc≤Tb with respect to the cloud point temperature (Tc° C.) of the film-forming solution. Forming a film under conditions by which this temperature range relationship is satisfied allows the obtaining of a porous film having high water permeability while also makes it possible to adjust the remaining amount of polyethylene glycol to be adjusted to a desirable range since solidification is completed with at least a portion of the polyethylene glycol molecules embedded in the backbone of the porous body due to the increase in the diffusion rate of the solidifying solution.

Moreover, in the production method as described above, a double-tube nozzle is used for the molding nozzle during film formation, and the film-forming solution is preferably extruded from the double-tube nozzle together with a hollowing agent to solidify the film-forming solution in a solution having water as a main component thereof. As a result thereof, a porous film having a hollow fiber membrane film structure can be easily produced. A known double-tube nozzle and hollowing agent ordinarily used in this type of field can be used without any particular limitations for the double-tube nozzle and hollowing agent used here.

Moreover, there are no particular limitations on the common solvent used in the film-forming solution provided it dissolves both the hydrophobic and hydrophilic polymer components, and a known solvent can be suitably selected and used. At least one type of solvent selected from the group consisting of N-methylpyrrolidone (NMP), dimethylformamide (DMF), dimethylacetoamide (DMAC) and dimethylsulfoxide (DMSO) is preferably used as the common solvent from the viewpoint of improving the stability of the film-forming solution. Dimethylacetoamide is used particularly preferably from the viewpoint of obtaining handling ease and high water permeability. In addition, at least one type of common solvent selected from the above group may also be used as a mixed solvent with another solvent. In this case, a mixed solvent is preferably used in which the total amount of the common solvent selected from the above group is preferably contained at 80% by weight or more and more preferably 90% by weight or more.

As a result of employing these production methods of the present invention, a porous film having superior water permeability and chemical resistance as well as superior durability unable to be obtained with conventional porous films can be easily and stably produced.

EXAMPLES

Although the following provides a detailed explanation of the present invention by indicating examples thereof, the present invention is not limited to these examples.

In the porous films described below, measurement of the degree of crystallization of the PVDF resin, measurement of specific surface area, measurement of the ratio of the total amount of β-type crystal and γ-type crystal based on the total amount of the crystalline portion of the PVDF resin, measurement of polyethylene glycol content based on 100 parts by weight of the PVDF resin, measurement of the weight average molecular weight of polyethylene glycol (PEG) contained in the film, measurement of the irregular sequence ratio of PVDF resin, measurement of the thickness of the backbone of the thick portion of the surface having the greatest density, measurement of the weight average molecular weight of the PVDF resin and chemical resistance testing of the porous films were carried out using the methods described below.

(1) Measurement of Degree of Crystallization of PVDF Resin

Differential scanning calorimetry (DSC) measurements were carried out under the following conditions using the DSC2920 apparatus manufactured by TA Instruments Japan. The baseline for calculating the amount of absorbed heat extended from 60° C. to the temperature at which melting was completed (about 190° C.), and the degree of crystallization of PVDF was calculated using a value of 104.7 (J/g) for the quantity of heat of crystal fusion.

Sample weight: Approx. 5 mg
Sample cell: Aluminum pan
Heating rate: 5° C./min
Purge gas: Helium
Gas flow rate: 20 ml/min (2) Measurement of Specific Surface Area A freeze-dried porous hollow fiber membrane was cut to a length of 2 mm to prepare 1 g of membrane followed by determining the specific surface area thereof according to the BET method using the SA3100 manufactured by Coulter Electronics, Ltd.

(3) Measurement of Combined Ratio of β-type Crystal and γ-type Crystal in Crystalline Portion of PVDF Resin Solid-State $^{19}$F-NMR measurements were carried out under the conditions indicated below using the DSX400 manufactured by Bruker BioSpin AG.

Probe: 2.5 mm MAS probe
Measuring mode: Single pulse (pulse mode: zg0)
$^{19}$F 900 pulse width: 5.0 μsec
Repeat standby time: 4 sec
MAS frequency: 32000 Hz
Measuring temperature: Room temperature (25° C.)
Internal standard: C6F6 (−163.6 ppm)

The combined ratio of β-type crystal and γ-type crystal was calculated using the equation indicated below based on the peak height ($H_\alpha$) of the signal indicating α-type crystals appearing at the location of −78.9 ppm, and the peak height ($H_{\alpha+\beta+\gamma}$) of the signal indicating the combined total of α-type, β-type and γ-type crystals appearing at −93.5 ppm.

$$\text{Ratio of β-type and γ-type crystals (\%)} = \{(H_{\alpha+\beta+\gamma} - H_\alpha)/(H_{\alpha+\beta+\gamma} + H_\alpha)\} \times 100$$

(4) Measurement of PEG Content of Porous Film Based on 100 Parts by Weight of PVDF Resin $^1$H-NMR measurements of the porous films were carried out using $d_5$-DMF for the solvent and tetramethylsilane for the internal standard (0 ppm), and using the Lambda 400 manufactured by JEOL Ltd. for the NMR measuring system. Polyethylene glycol content was calculated using the equation below from the integral value of the signal attributable to polyethylene glycol appearing in the vicinity of 3.6 ppm ($I_{PEG}$) and the integral value of the signal attributable to PVDF resin appearing in the vicinity of 2.3 to 2.4 and 2.9 to 3.2 ppm ($I_{PVDF}$) in the resulting spectra.

$$\text{Polyethylene glycol content (wt \%)} = \{44(I_{PEG}/4)/60(I_{PVDF}/2)\} \times 100$$

(5) Measurement of Weight Average Molecular Weight of PEG in Porous Film 0.1 g of porous film were dissolved in 10 ml of acetone followed by dropping this solution into 100 ml of water to re-precipitate the polymers that compose the film and separate the polyethylene glycol remaining in the film in the form of an aqueous solution. Subsequently, the solution containing the PEG was concentrated with an evaporator followed by dissolving in the mobile phase indicated below to obtain a polyethylene glycol solution. Using 200 ml of the resulting solution, GPC measurement was carried out under the following conditions to determine the weight average molecular weight (as PEG standard sample).

Apparatus: HLC-8220GPC (Tosoh Corp.)
Column: Shodex SB-803HQ
Mobile phase: 0.7 ml/min $KH_2PO_4$ (0.02 mM)+$Na_2HPO_4$ (0.02 mM) aqueous solution
Detector: Differential refractive index detector (6) Measurement of Irregular Sequence Ratio of PVDF Resin $^{19}$F-NMR measurements of the porous films were carried out using d$_5$-DMF for the solvent and CFCl$_3$ for the internal standard (0 ppm), and using the Lambda 400 manufactured by JEOL Ltd. for the NMR measuring system. The irregular sequence ratio of PVDF resin was calculated using the equation below from the integral value of the signal attributable to the regular sequence appearing in the vicinity of −92 to −97 ppm (I$_r$) and the integral value of the signal attributable to the irregular sequence appearing in the vicinity −114 to −117 ppm (I$_i$) in the resulting spectra.

Irregular sequence ratio (%)={I$_i$/(I$_r$+I$_i$)}×100

(7) Measurement of Thickness of Backbone of Thick Portion of Surface Having Greatest Density Ten or more pores on both surfaces of a freeze-dried porous film were observed at an observable magnification in a single field using an electron microscope, and the pores in the resulting electron micrographs were approximated to be circular followed by treating the diameter determined from the mean surface area thereof as the pore diameter in that surface. Using the surface of the porous film having the smaller pore diameter as the surface having the greatest density, the resulting pore diameter was treated as the pore diameter of the surface having the greatest density. Similarly, a cross-section of a freeze-dried porous film was observed at a magnification of 10,000×, and comparison of the thickness of the backbone on the opposite side from the surface having the greatest density in that field was continued to ⅕ the film thickness to confirm that the backbone increases in thickness continuously or in a stepwise manner.

(8) Measurement of Weight Average Molecular Weight of PVDF Resin

Using 50 ml of a test solution in which PVDF resin was dissolved in DMF at a concentration of 1.0 mg/ml, GPC measurement was carried out under the conditions indicated below to determine the weight average molecular weight thereof (as PMMA).

Apparatus: HLC-8220GPC (Tosoh Corp.)
Column: Shodex KF-606M, KF-601
Mobile phase: 0.6 ml/min DMF
Detector: Differential refractive index detector (9) Porous Film Chemical Resistance Test Testing of the chemical resistance of porous films was carried out by immersing a porous hollow fiber membrane in a chemical solution for a prescribed amount of time, measuring the tensile rupture elongation by carrying out a tensile test, and calculating the elongation retention ratio (%) using the following equation from the rupture elongation prior to immersion (EO) and the rupture elongation following chemical deterioration resulting from immersing for n days (En).

Elongation retention ratio (%)=(En/EO)×100

Here, the chemical used in chemical resistance testing consisted of a mixed aqueous solution containing sodium hydroxide at 4% by weight and sodium hypochlorite at an effective chlorine concentration of 0.5% by weight, and the porous films were immersed at a temperature of 25° C. In addition, measurement of tensile elongation was carried out at a clamping interval of 50 mm and pulling speed of 100 mm/min.

Example 1

27% by weight of a PVDF resin in the form of PVDF homopolymer having a weight average molecular weight of 350,000 (KYNAR741, Arkema Co., Ltd.) and 15% by weight of polyethylene glycol having a weight average molecular weight of 35,000 (Polyethylene Glycol 35000, Merck Ltd.) were dissolved in 58% by weight of dimethylacetoamide at 70° C. to obtain a film-forming solution. The cloud point temperature of this solution was 75° C.

This film-forming solution was extruded with an internal liquid in the form of water from a double-tube nozzle (outermost diameter: 1.3 mm, intermediate diameter: 0.7 mm, innermost diameter: 0.5 mm, the same nozzle was used in the following examples and comparative examples), passed through a free running distance of 200 mm and solidified in water at 77° C. followed by removing the solvent in water at 60° C. to obtain a porous film having a hollow fiber membrane film structure. The properties of the resulting film are summarized in Table 1, including those of the following examples.

Example 2

30% by weight of the same PVDF resin as EXAMPLE 1 and 13% by weight of the same polyethylene glycol as EXAMPLE 1 were dissolved in 57% by weight of dimethylacetoamide at 70° C. to obtain a film-forming solution. The cloud point temperature of this solution was 76° C.

This film-forming solution was extruded from a double-tube nozzle together with an internal liquid in the form of water, passed through a free running distance of 200 mm and solidified in water at 80° C. followed by removing the solvent in water at 60° C. to obtain a porous film having a hollow fiber membrane film structure.

Example 3

27% by weight of the same PVDF resin as EXAMPLE 1, 9% by weight of the same polyethylene glycol as EXAMPLE 1 and 6% by weight of polyethylene glycol having a weight average molecular weight of 150,000 (R-150, Meisei Chemical Works, Ltd.) were dissolved in 58% by weight of dimethylacetoamide at 60° C. to obtain a film-forming solution. The cloud point temperature of this solution was 75° C.

This film-forming solution was extruded from a double-tube nozzle together with an internal liquid in the form of water, passed through a free running distance of 200 mm and solidified in water at 80° C. followed by removing the solvent in water at 60° C. to obtain a porous film having a hollow fiber membrane film structure.

Example 4

A porous film having a hollow fiber membrane film structure was produced entirely under the conditions of EXAMPLE 1 with the exception of using a PVDF homopolymer having a weight average molecular weight of 300,000 (SOLEF6010, Solvay Solexis, Inc.) for the PVDF resin. The cloud point temperature of the film-forming solution at this time was 75° C.

Example 5

A porous film having a hollow fiber membrane film structure was produced entirely under the conditions of EXAMPLE 1 with the exception of using a PVDF homopolymer having a weight average molecular weight of 290,000 (KF1000, Kureha Corp.) for the PVDF resin. The cloud point temperature of the film-forming solution at this time was 75° C.

Example 6

A porous film having a hollow fiber membrane film structure was produced entirely under the conditions of EXAMPLE 1 with the exception of using a PVDF homopolymer having a weight average molecular weight of 380,000 (SOLEF6012, Solvay Solexis, Inc.) for the PVDF resin. The cloud point temperature of the film-forming solution at this time was 75° C.

Comparative Example 1

25% by weight of the same PVDF resin as EXAMPLE 1 and 15% by weight polyethylene glycol having a weight average molecular weight of 6,000 (Polyethylene Glycol 6000, Wako Pure Chemical Industries, Ltd.) were dissolved in 74% by weight of dimethylacetoamide at 70° C. to obtain a film-forming solution. The cloud point temperature of this solution was 100° C. or higher.

This film-forming solution was extruded from a double-tube nozzle together with an internal liquid in the form of water, passed through a free running distance of 200 mm and solidified in water at 80° C. followed by removing the solvent in water at 60° C. to obtain a porous film having a hollow fiber membrane film structure.

Comparative Example 2

20% by weight of a PVDF resin in the form of PVDF homopolymer having a weight average molecular weight of 420,000 (KYNAR301F, Arkema Co., Ltd.) and 6% by weight of the same polyethylene glycol as Comparative EXAMPLE 1 were dissolved in 74% by weight of dimethylacetoamide at 70° C. to obtain a film-forming solution. The cloud point temperature of this solution was 100° C. or higher.

This film-forming solution was extruded from a double-tube nozzle together with an internal liquid in the form of water, passed through a free running distance of 200 mm and solidified in water at 30° C. followed by removing the solvent in water at 60° C. to obtain a porous film having a hollow fiber membrane film structure. This hollow fiber membrane demonstrated low withstand pressure strength and was unable to withstand actual use during filtration.

Comparative Example 3

25% by weight of the same PVDF resin as EXAMPLE 1 and 10% by weight polyethylene glycol having a weight average molecular weight of 500,000 (Polyethylene Glycol 500000, Wako Pure Chemical Industries, Ltd.) were mixed with 65% by weight of dimethylacetoamide. Although this mixture was stirred at 70° C., a homogeneous film-forming solution was unable to be obtained, and a hollow fiber membrane was unable to be produced. In addition, cloud point temperature was unable to be measured since a homogeneous film-forming solution was unable to be produced.

Comparative Example 4

40% by weight of PVDF resin in the form of the same PVDF homopolymer as EXAMPLE 5 was mixed with 60% by weight of gamma-butyrolactone followed by kneading and dissolving at 170° C. to obtain a film-forming solution. This solution did not have a cloud point temperature.

This film-forming solution was extruded from a double-tube nozzle together with an internal liquid in the form of gamma-butyrolactone, passed through a free running distance of 50 mm and solidified in an aqueous solution of 80% gamma-butyrolactone at 30° C. followed by removing the solvent in water at 60° C. to obtain a porous film having a hollow fiber membrane film structure.

Example 7

25% by weight of a PVDF resin in the form of the same PVDF homopolymer as EXAMPLE 1 and 15% by weight of polyethylene glycol having a weight average molecular weight of 20,000 (Polyethylene Glycol 20000, Wako Pure Chemical Industries, Ltd.) were dissolved in 60% by weight of dimethylacetoamide at 70° C. to obtain a film-forming solution. The cloud point temperature of this solution was 78° C. FIG. 1 shows the $^{19}$F-NMR spectrum of the PVDF resin having an irregular sequence ratio of 9.4% used in EXAMPLE 7.

This film-forming solution was extruded from a double-tube nozzle together with an internal liquid in the form of water in the same manner as EXAMPLE 1, passed through a free running distance of 200 mm and solidified in water at 80° C. followed by removing the solvent in water at 60° C. to obtain a porous film having a hollow fiber membrane film structure.

[Structural Evaluation]

Figure 2:
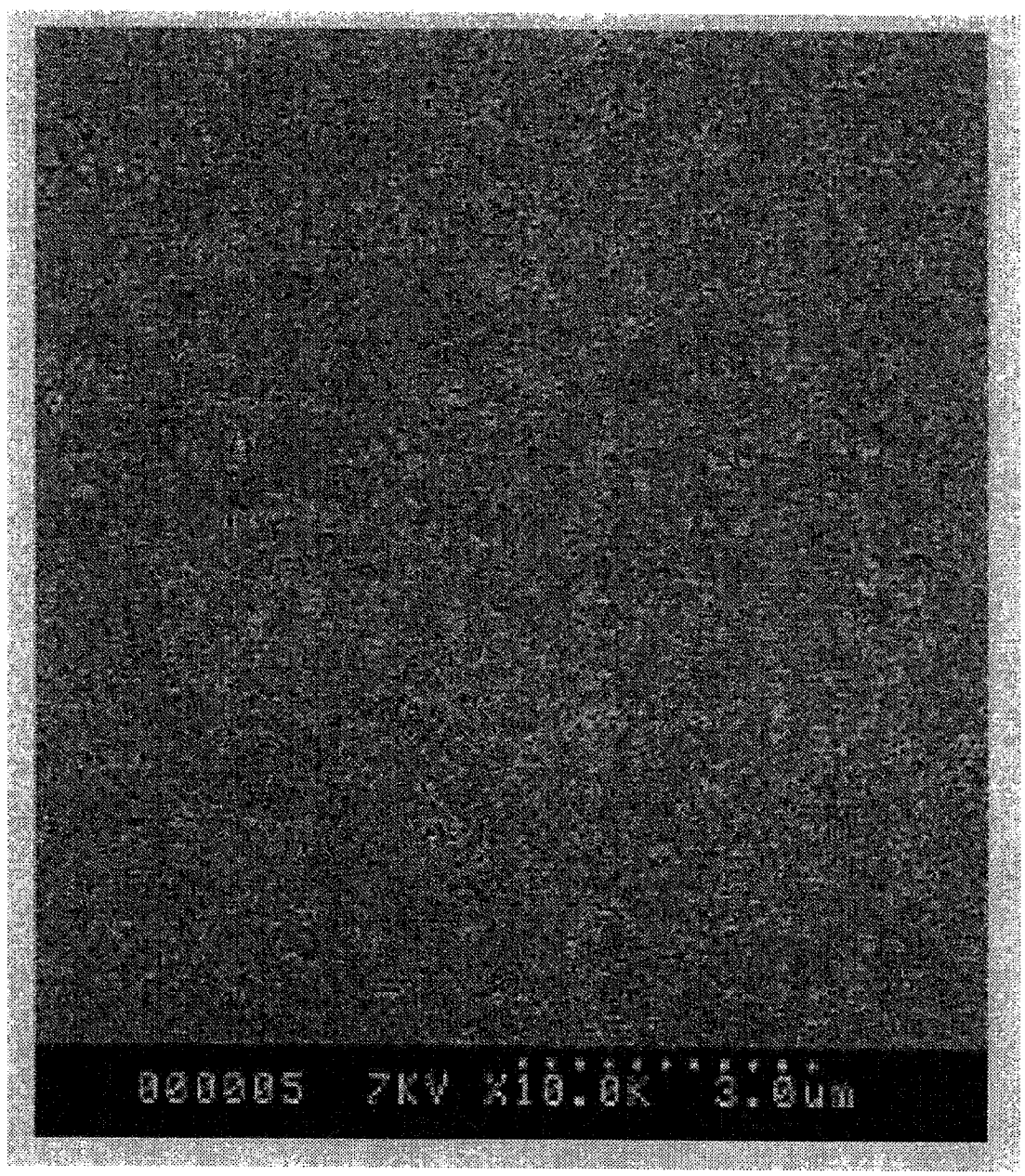
FIG. 2 is an electron micrograph (magnification: 10,000×) of a surface having the greatest density (outer surface) of a porous film of EXAMPLE 7 in the present invention.
Figure 3:
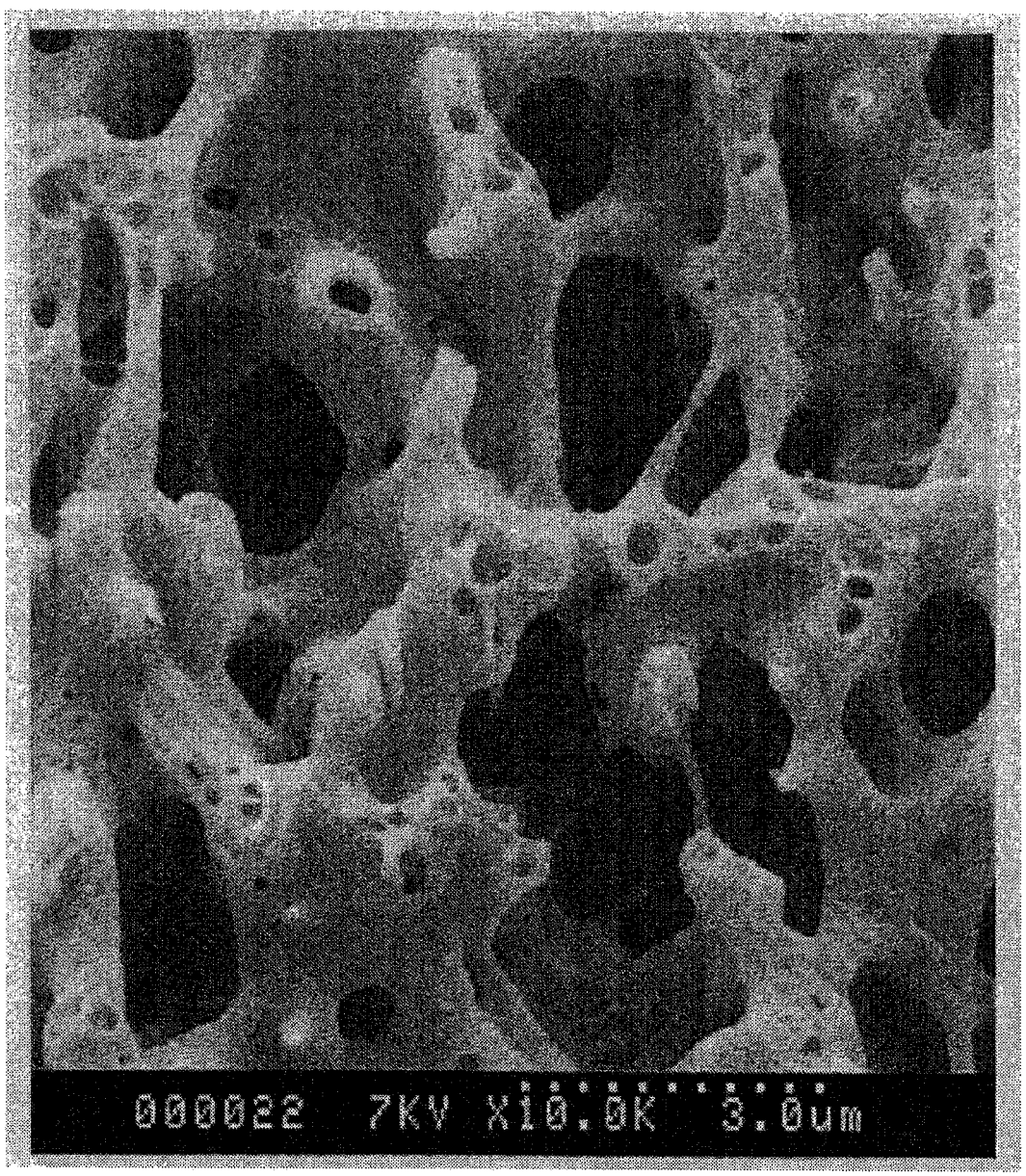
FIG. 3 is an electron micrograph (magnification: 10,000×) taken near the center of the thick portion of a porous film of EXAMPLE 7 in the present invention.

The structure of the porous film of EXAMPLE 7 was evaluated. FIG. 2 shows an electron micrograph (magnification: 10,000×) of the surface having the greatest density (outer surface) of the porous film of EXAMPLE 7, while FIG. 3 shows an electron micrograph (magnification: 10,000×) taken near the center of the thick portion of the porous film of EXAMPLE 7. As shown in FIGS. 2 and 3, the porous film of EXAMPLE 7 has a dense surface in which numerous pores are formed in the surface thereof. In addition, in a cross-section of the porous film, a backbone of hollow ring-like polymer components was confirmed to be crosslinked three-dimensionally to form a mesh-like network resulting in a film structure provided with numerous pores. In addition, the thickness of the backbone of hollow ring-like polymer components was confirmed to increase from the side of the surface having the greatest density shown in FIG. 2 towards the center of the thick portion of the film as shown in FIG. 3.

[Evaluation of Chemical Resistance]

Chemical resistance tests were carried out using the porous films having a hollow fiber membrane film structure obtained in Examples 1 to 7 and Comparative Examples 1, 2 and 4. Following immersion, the hollow fiber membranes were taken out of the chemical agent at 1, 3, 7 or 14 days, adequately rinsed with water and subjected to a tensile test. The results are shown in Table 1.

TABLE 1

|  | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 |
|---|---|---|---|---|---|---|---|---|---|---|---|
| PVDF resin degree of crystallization (%) | 62 | 65 | 60 | 67 | 70 | 67 | 65 | 61 | 57 | — | 71 |

TABLE 1-continued

|  | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 |
| --- | --- | --- | --- | --- | --- | --- | --- | --- | --- | --- | --- |
| Porous film average specific surface area (m²/g) | 6.8 | 5.5 | 13.1 | 7.0 | 7.4 | 10.1 | 6.2 | 35.3 | 3.1 | — | 98.6 |
| Product of degree of crystallization and film specific surface area (% · m²/g) | 421.6 | 357.5 | 786 | 469 | 518 | 676.7 | 403 | 2153.3 | 176.7 | — | 7000.6 |
| Combined ratio of β-type and γ-type crystals (%) | 27 | 25 | 27 | 15 | 33 | 16 | 26 | 28 | 38 | — | 55 |
| Residual PEG content in hollow fiber membrane (wt %) | 1.9 | 2.5 | 3.5 | 1.9 | 2.2 | 2.5 | 0.2 | 0 | 0 | — | 0 |
| Weight average molecular weight of PEG in hollow fiber membrane (Mw) | 40,000 | 37,000 | 245,000 | 42,000 | 42,000 | 45,000 | 25,000 | — | — | — | — |
| Irregular sequence ratio of PVDF resin in hollow fiber membrane (%) | 9.4 | 9.4 | 9.4 | 8.6 | 7.8 | 8.6 | 9.4 | 9.4 | 10.3 | — | 7.8 |
| Pure water flux (L/m³ · hr @0.1 MPa) | 950 | 510 | 1200 | 980 | 880 | 1050 | 1000 | 110 | 600 | — | 500 |
| Ratio of hydrophobic polymer component in spinning solution (wt %) | 27 | 30 | 27 | 25 | 25 | 26 | 25 | 25 | 20 | 25 | 40 |
| Irregular sequence ratio of raw material PVDF resin (%) | 9.4 | 9.4 | 9.4 | 8.6 | 7.8 | 8.6 | 9.4 | 9.4 | 10.3 | 9.4 | 7.8 |
| Ratio of hydrophilic polymer component in spinning solution (wt %) | 15 | 13 | 15 | 15 | 20 | 15 | 15 | 15 | 6 | 10 | 0 |
| Weight average molecular weight of raw material PEG (Mw) | 35,000 | 35,000 | 81,000 | 35,000 | 35,000 | 35,000 | 20,000 | 6,000 | 6,000 | 500,000 | — |
| Tensile elongation retention ratio after immersing for 1 day (%) | 95 | 97 | 92 | 88 | 80 | 89 | 94 | 55 | 96 | — | 30 |

TABLE 1-continued

|  | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 |
|---|---|---|---|---|---|---|---|---|---|---|---|
| Tensile elongation retention ratio after immersing for 3 days (%) | 88 | 85 | 80 | 73 | 67 | 80 | 88 | 19 | 90 | — | 11 |
| Tensile elongation retention ratio after immersing for 7 days (%) | 80 | 81 | 69 | 61 | 42 | 68 | 72 | 8 | 82 | — | 5 |
| Tensile elongation retention ratio after immersing for 14 days (%) | 76 | 78 | 60 | 60 | 18 | 62 | 67 | 5 | 75 | — | Unable to be measured |
| Withstand pressure performance | ◯ | ◯ | ◯ | ◯ | ◯ | ◯ | ◯ | 0 | Unable to be evaluated | — | ◯ |

According to the PVDF porous film of the present invention, since high chemical resistance to washing chemicals and the like is demonstrated while maintaining high water permeability, the porous film can be used over a long period of time in applications accompanied by washing suspended matter and other debris accumulated on the film surface due to filtration using aqueous alkaline solutions and other chemicals. Moreover, since the PVDF porous film of the present invention can be produced both easily and stably, it contributes to improved productivity and economy. Consequently, it can be widely and effectively used in fields requiring films to demonstrate both high water permeability and chemical resistance in the manner of washing suspended matter and other debris accumulated on the film surface due to filtration with chemicals, such as water purification treatment at water treatment plants, filtration treatment of river water and lake water, filtration purification of industrial water and wastewater treatment, and liquid filtration treatment such as pretreatment for desalination of seawater.

We claim:

1. A porous film comprising a polymer component having a polyvinylidene fluoride (PVDF), resin as a main component thereof,
    wherein the degree of crystallization of the PVDF resin in the film is 50% or more but not more than 90%, and
    the product of the degree of crystallization of the PVDF resin in the film and a specific surface area of the film is 300 (%·m$^2$/g) or more but not more than 2000 (%·m$^2$/g).

2. The porous film according to claim 1, wherein a total amount of β-type crystal and γ-type crystal in a crystalline portion of the PVDF resin is 30% or less based on a total amount of the crystalline portion of the PVDF resin.

3. The porous film according to claim 1, wherein polyethylene glycol having a weight average molecular weight of 20,000 or more but not more than 300,000 is contained as the polymer component at 0.01 parts by weight or more but not more than 3 parts by weight based on 100 parts by weight of the PVDF resin.

4. The porous film according to claim 1, wherein the PVDF resin has an intramolecular irregular sequence ratio as determined by $^{19}$F-NMR measurement of 8.8% or more but less than 30.0%.

5. The porous film according to claim 1, wherein the porous film has a film structure of a hollow fiber membrane.

6. The porous film according to claim 1, wherein the porous film has a film structure in which a backbone of the polymer component forms a mesh-like network and pores are provided therein, and the thickness of the backbone of the polymer component increases continuously or in a stepwise manner to at least ⅕ the film thickness from the side of the top and bottom film surfaces having the greatest density.

7. A method for washing a porous film, comprising contacting the porous film according to claim 1 with an alkaline solution.

8. A filtering method, comprising contacting the porous film according to claim 1 with an aqueous solution and an alkaline solution alternately at least one time.

9. A method for producing a porous film comprising: producing a porous film having a polyvinylidene fluoride (PVDF) resin as a main component thereof by extruding, from a molding nozzle, a film-forming solution which at least comprises a hydrophobic polymer component having a PVDF resin as a main component thereof, a hydrophilic polymer component and a common solvent for both the hydrophobic and hydrophilic polymer components, and solidifying the film-forming solution in a solution having water as a main component thereof, wherein polyethylene glycol having a weight average molecular eight of 20,000 or more but not more than 150,000 is used as the hydrophilic polymer component,
    wherein the degree of crystallization of the PVDF resin in the film is 50% or more but not more than 90% and
    the product of the degree of crystallization of the PVDF resin in the film and a specific surface area of the film is 300 (%·m$^2$/g) or more but not more than 2000 (%·m$^2$/g).

10. The method for producing a porous film according to claim 9, wherein a PVDF resin having an intramolecular irregular sequence ratio as determined by $^{19}$F-NMR measurement of 8.8% or more but less than 30.0% is used as the PVDF resin.

11. The method for producing a porous film according to claim 9, wherein the film-forming solution contains 20% by weight or more but not more than 35% by weight of the hydrophobic polymer component, and 8% by weight or more but not more than 30% by weight of the hydrophilic polymer component.

12. The method for producing a porous film according to claim 9, wherein the temperature of the solution for solidifying the film-forming solution (Tb° C.) satisfies the relationship of Td+5≤Tb≤Td+30 and the e relationship of Td≤Tc≤Tb with respect to the temperature of the film-forming solution (Td° C.) and the cloud point temperature of the film-forming solution (Tc° C.).

13. The method for producing a porous film according to claim 9, wherein the molding nozzle is a double-tube nozzle, and a porous film having a hollow fiber membrane structure is produced by extruding the film-forming solution from the molding nozzle together with a hollowing agent, and solidifying the same in a solution having water as a main component thereof.

14. The method for producing a porous film according to claim 9, wherein the film-forming solution contains at least dimethylacetoamide as the common solvent.

* * * * *

UNITED STATES PATENT AND TRADEMARK OFFICE
CERTIFICATE OF CORRECTION

PATENT NO. : 8,931,647 B2
APPLICATION NO. : 12/297580
DATED : January 13, 2015
INVENTOR(S) : Satoshi Shiki et al.

Page 1 of 1

It is certified that error appears in the above-identified patent and that said Letters Patent is hereby corrected as shown below:

Claims

In claim 1, column 19, line 49, delete "," after "(PVDF)".

Signed and Sealed this
Twentieth Day of October, 2015

Michelle K. Lee
*Director of the United States Patent and Trademark Office*